(12) United States Patent
Singer

(10) Patent No.: US 6,178,418 B1
(45) Date of Patent: Jan. 23, 2001

(54) DISTRIBUTED DATA WAREHOUSE QUERY AND RESOURCE MANAGEMENT SYSTEM

(75) Inventor: Richard E. Singer, San Francisco, CA (US)

(73) Assignee: Noetix Corporation, Bellevue, WA (US)

(*) Notice: Under 35 U.S.C. 154(b), the term of this patent shall be extended for 0 days.

(21) Appl. No.: 09/123,729

(22) Filed: Jul. 28, 1998

(51) Int. Cl.7 ...................................... G06F 17/30
(52) U.S. Cl. .......................... 707/3; 713/155; 370/255
(58) Field of Search ................ 707/1–10, 100–104, 707/200–206; 713/155; 370/255, 352

(56) References Cited

U.S. PATENT DOCUMENTS

| | | | |
|---|---|---|---|
| 5,812,639 | * 9/1998 | Bartholomew et al. | 370/352 |
| 5,898,780 | * 4/1999 | Liu et al. | 713/155 |
| 6,009,081 | * 12/1999 | Wheeler et al. | 370/255 |
| 6,012,067 | * 1/2000 | Sarkar | 707/103 |
| 6,023,695 | * 2/2000 | Osborn et al. | 707/3 |
| 6,023,696 | * 2/2000 | Osborn et al. | 707/3 |
| 6,026,391 | * 2/2000 | Osborn et al. | 707/2 |

\* cited by examiner

*Primary Examiner*—Ruay Lian Ho
(74) *Attorney, Agent, or Firm*—Goldstein & Canino

(57) ABSTRACT

An architecture and method of operation for servicing data queries within a distributed data warehouse system composed of a plurality of physical servers housing the data to be accessed. Queries are generated by data accessing and processing applications executing on client computers within the distributed data warehouse system. The method enables queried data to be requested by, and delivered to respective client computers without having to pass through a middle-tier server. The method further provides a manageable and scalable system architecture which will readily support a variety of physical servers, including legacy databases, and query format translations when required.

14 Claims, 6 Drawing Sheets

DISTRIBUTED DATA WAREHOUSE QUERY AND RESOURCE MANAGEMENT SYSTEM

BACKGROUND OF THE INVENTION

1. Field of the Invention

The present invention relates to data warehousing and decision support systems. More particularly, the invention relates to a system and method of operation to support data query and retrieval in a data warehousing environment including a plurality of data providing computers accessible via a suitable communication network, wherein the information appears as though it may be emanating from a single (logical) data source.

2. Background and Objects of the Invention

The advent of mainframe computing provided the ability to manage large amounts of data in a manner that had not been previously possible. The advantages of managing such volumes of data by computer was obvious, especially to government and large corporate entities. As can be seen in FIG. 1A, the architecture of such prior art systems, such as system 10a, initially provided a user accessing the system with a terminal 12 that was coupled to the mainframe 20 by way of a cable 12a. The cable 12a establishes what may be termed a 'communication channel'. These systems generally provided very simple ASCII-type user interfaces, wherein data was presented in tables (or lists) on monochrome screens. The early terminal interfaces enabled a user to enter, view, and modify the stored data, which could later be printed for hardcopy records. Importantly, even with the significant expense in deploying and maintaining these systems, they provided a cost-effective means to store, maintain, and manipulate very large amounts of data in a manner never before possible.

Soon thereafter, the advent of the mini-computer resulted in the introduction of reduced cost low-end database systems. Now it was possible for relatively small and medium sized companies to enjoyed the benefits of computer based data handling and management. Again, the interface screens employed by users of such systems were rather mundane by today's high resolution graphical user interface (GUI) standards. However, the availability of mini-computers also made it possible to have a plurality of such systems employed within an organization. For example, different departments or geographical locations within a single organization could employ one or more such systems.

Eventually, the advent of server based systems resulted from a merging of low-cost microprocessor based technology, and complex network and multi-user operating systems. These system architectures were, of course, driven by the introduction and proliferation of the personal computer or PC. As the computing power of these personal computer systems rapidly increased, and as prices continued to drop, the ubiquitous PC lead to the wide scale deployment of LAN based client/server computing environments. These systems provided advantages with regard to scalability and redundancy not previously available (especially when considering cost). Another significant advantage of these systems was their ability to run a variety of business application programs, which evolved and steadily improved in power and ease-of-use. The cost of these application programs was also quite low when compared to the cost of mainframe and mini-computer software. The PC based applications where generally simple and intuitive to use, and provided a 'standard interface' (GUI) having excellent graphical capabilities. Once a user understood the basics of the interface, new applications, or updated versions of older applications (having additional feature sets), were easy to learn and use.

However, the significant investment in mainframe and mini-computer based database systems, termed by some as 'legacy' database systems, combined with their stability and relative reliability, lead to a desire by some to mix legacy systems with newer server based data storage systems, which are often referred to as data warehousing systems. As depicted in FIG. 1B, when desiring to maintain older or original data providing systems, the result was the birth of hybrid systems. Whether hybrid (consisting of a plurality of mixed physical servers) or homogeneous (consisting of a plurality of the same or equivalent physical servers) these systems may require the analysis of information stored therein, and may accordingly be termed 'decision support systems' or DSS environments. An illustrative DSS 10b, as shown in FIG. 1B, includes clients such as client 14a, 14b, etc., with the ability to access data stored in one or more data marts 20a, data warehouses 20b, and/or legacy data-base systems 20c. It is important to note that the DSS environment may be formed by a mixed or hybrid arrangement (as illustrated), or a homogenous arrangement, say consisting only of data warehouses 20b. In each instance, however, a number of problems resulted from the desire to establish and maintain such DSS architectures. For example, certain database systems may employ accessing formats (or query languages) that differed from later PC and client/server based data warehouse query formats. This results in a need for query translation and reformatting. Also, as data within an organization could be located on any one of a number of data providing physical servers, there was a need to determine where the specific data being requested was actually located. This need to locate data, which has been exacerbated by the introduction of Web and enterprise resource planning (ERP) applications (which are typically distributed throughout an enterprise or organization), may be termed 'query routing'. That is, query requests are steered or routed to a particular database, data warehouse, or data mart, wherein the data required is located. Query routing generally works best when based on cost and business rules.

Yet, other problems existed in these distributed DSS architectures, such as the need to manage redundancy, replication, and load-balancing, as well as provide security to confidential or sensitive information. In short, the DSS landscape was complex and full of pitfalls! The recent explosion in the use of the Internet as a data distributing medium certainly further complicated the situation.

One solution which was initially embraced to solve the above listed problems and concerns is illustrated in FIG. 2. The arrangement therein employed a middle-tier server 22, which was interposed between the client PCs, such as 16aa and 16bb, and the data sources, such as data mart 20a, data warehouse 20b, and or legacy data bases 20c. In theory, all the above listed problems, including translation, query routing, security, etc., would simply be handled by the middle-tier server 22 employing suitable 'middle-ware' software. A request for data would be passed to the middle-tier server 22, translated if necessary, and passed to the appropriate system to satisfy the query. The queried data would then be passed back to the requesting application program (executing on a respective client PC 16) via the middle-tier server. As one skilled in the art will recognize, the architecture of FIG. 2 clearly has several major drawbacks. First, the middle-tier server 22 is clearly a bottleneck for the flow of information. Not only do the queries flow through the middle-tier server 22, all requested (queried) data also passed through it. If very large volumes of data are requested by a client PC 16, the utilization demands placed on such a (middle-tier) server increases quickly. If a large number of users are to be serviced by the arrangement of FIG. 2, the middle-ware server may need to be a very high throughput, high-cost system. Accordingly, the middle-tier server 22 may require more computing power than the actual data mart 20a or data warehouse 20b systems! In addition, if the middle-tier server 22 were to fail and go down, the entire system would generally be rendered inoperable with regard to delivering queried data to the client PCs 16. Skilled individuals will also appreciate the difficulty in scaling the arrangement of FIG. 2, wherein a large number of client PCs must be added over a period of time. Eventually, regardless of the actual middle-tier server computing power available, scalability of the arrangement of FIG. 2 becomes a significant issue.

Therefore, when considering prior art DSS system architectures, there is a need for more fault tolerant, scalable, and secure arrangements to overcome the above stated problems. Objects of the present invention are, therefore, to provide new and improved decision support and data warehousing system methods and architectures to support the rapid access to large amounts of distributed data having one or more of the following capabilities, features, characteristics, and or advantages:

employs an architecture not requiring a bottleneck producing middle-tier server configuration;

significantly improved system throughput over many presently available DSS architectures;

incorporates a 'logical server', which may be used to implement resource management and dynamically balance the loading of a plurality of physical data providing sources including data marts, data warehouses, legacy databases, Web based information servers, etc.

supports query routing that may be dynamically altered in a manner that is transparent to the system users (i.e., clients PCs and client applications)

a scalable and dynamically alterable architecture incorporating redundancy, load balancing, and security;

enables queried data to be directly transmitted from a data providing source computer, such as a data warehouse or a data mart, to the requesting client computer by way of virtually any available means to support networking and communication;

enables easy management and reconfiguration, possibly from a single location;

supports automatic and transparent client driver software updates, as needed or determined based on client generated query requests; and simple relatively low cost architecture employing embodiments based on many off-the shelf hardware components.

The above listed objects, advantages, and associated novel features of the present invention, as well as others, will become more apparent with a careful review of the description and figures provided herein. Attention is called to the fact, however, that the drawings and the associated description are illustrative and exemplary only, and variations are certainly possible.

SUMMARY OF THE INVENTION

In accordance with the present invention a method and architecture for servicing data queries within a distributed data warehousing system is provided. The queries are generated by at least one data accessing and or data processing application executing on at least one client computer. The distributed data warehousing system is composed of a plurality of physical servers housing data to be accessed, wherein the physical servers may require one or more specific formats to be compatible with the queries generated by the client computers. An embodiment of the method may comprise the following steps. When a query is generated for data required by at least one application executing on the client computer, the query is passed to a connection driver. The connection driver may simply be a specialized software driver, such as a TSR or a VDD, executing on said client computer. The connection driver then forwards the query to a query server. (It may be assumed that the client computers, the query server, and all physical servers housing data are coupled via a suitable communication network.) The query server would next receive and process the query to determine (possibly via a query router therein or executing thereon) a specific physical server within the distributed data warehouse system that is to be accessed in order to resolve the query for the required or requested data. The query server would then transmit back to the connection driver of the originating client computer, information indicating the physical server to access in order to satisfy the query. The client computer, generally by way of the connection driver, would transmit a request to the respective physical server to satisfy the query. The physical server would then transmit (via the communication network) the required data to the requesting client computer. Upon receiving the required data at the client computer, the connection driver would forward or pass said data to the data accessing and or data processing application executing on the client computer. It is important to note that the required data is passed directly from the physical server to the client computer without passing through the query server or any other middle-tier server.

In a most preferred embodiment of the present invention, should the particular physical server, as selected by the query server to satisfy the query, require a query format differing from the original query format received by the query server, the query may be rephrased (by the query server) to establish a query format that is compatible with said physical server. In this situation the information transmitted from the query server to the originating client computer's connection driver may include the rephrased query, which is to be sent to the physical server to access the required data. Therefore, the present invention may be employed to provide a means to translate queries, which would otherwise be incompatible with a selected physical server having the queried data. Further the translation is conducted in a manner that is transparent to the application executing on the client computer.

BRIEF DESCRIPTION OF THE DRAWINGS

In the drawings, like elements are assigned like reference numerals. It is important to note that each of the embodiments of the invention depicted are but one of a number of possible arrangements utilizing the fundamental concepts of the present invention. The drawings are briefly described as follows.

LIST OF REFERENCE NUMERALS USED IN THE DRAWINGS

10a—A prior art mainframe database system
10b—A prior art DSS arrangement
12—(user) terminal
12a—communication channel (or link)
14a—client (sales)
14b—client (purchasing)
16—client PC
16a—client application
16b—client connection driver
16c—network interface circuit (NIC)
20—mainframe computer
20a—data mart
20b—data warehouse
20c—legacy database or RDBMS
22—middle-tier server
26—query server
26a—logical server (with virtual tables)
26b—query router
26c—metadata repository
28—communication network
50 to 68—flowchart blocks

LIST OF COMMONLY USED ACRONYMS

| | |
|---|---|
| C/S | Client-Server |
| DM | Data Mart |
| DSS | Decision Support System |
| DW | Data Warehouse |
| ERP | Enterprise Resource Planning |
| OLE | Object Linking and Embedding |
| PC | Personal Computer (client computer) |
| RDBMS | Relational Data Base Management System |
| SQL | System Query Language |
| TSR | Temporary-Stay-Resident |
| VDD | Virtual Device Driver |
| VLDB | Very Large Data Bases |

DETAILED DESCRIPTION OF THE PREFERRED EMBODIMENTS

Figure 1A:
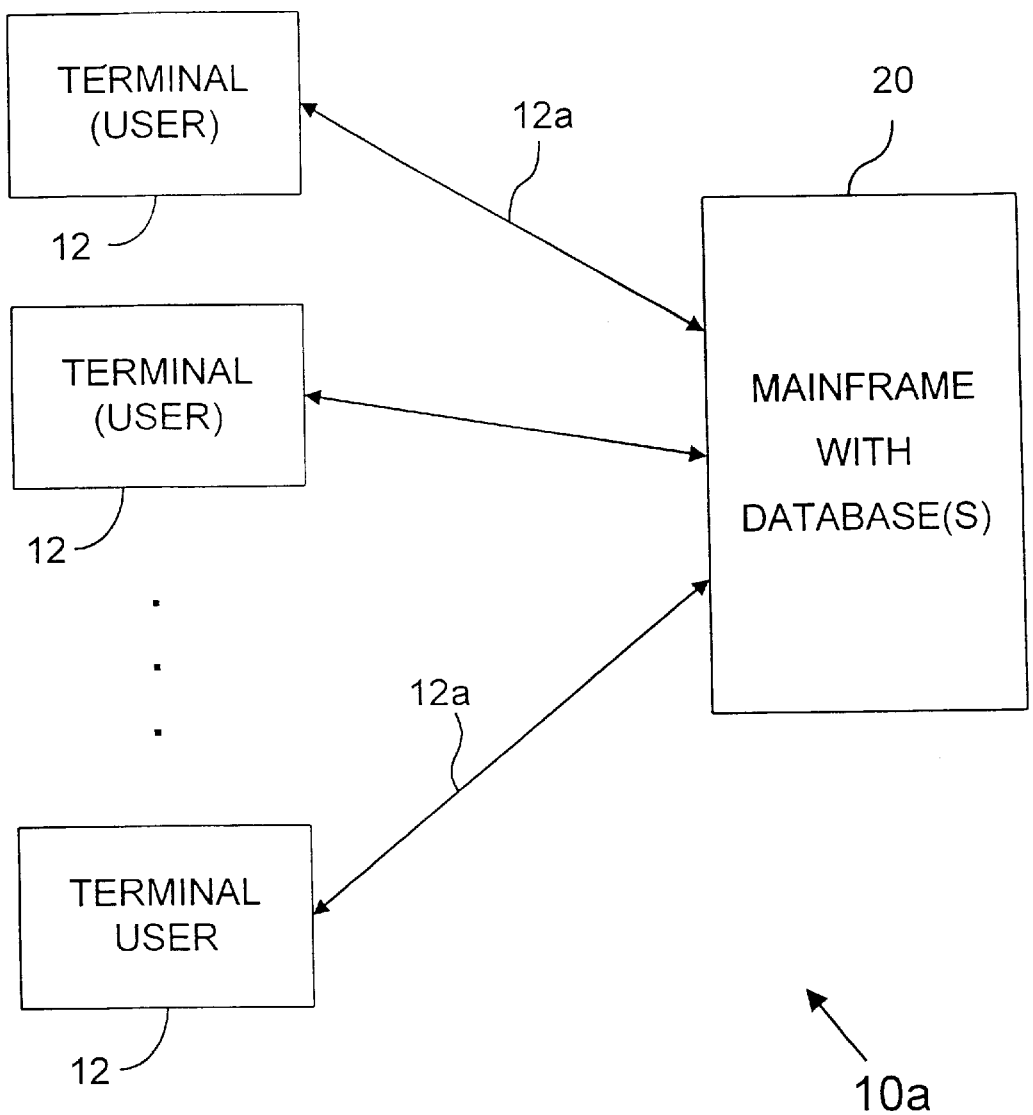
FIG. 1A provides a high-level block diagram of a simple mainframe based prior art computing arrangement employing terminals for user access to the system.
Figure 1B:
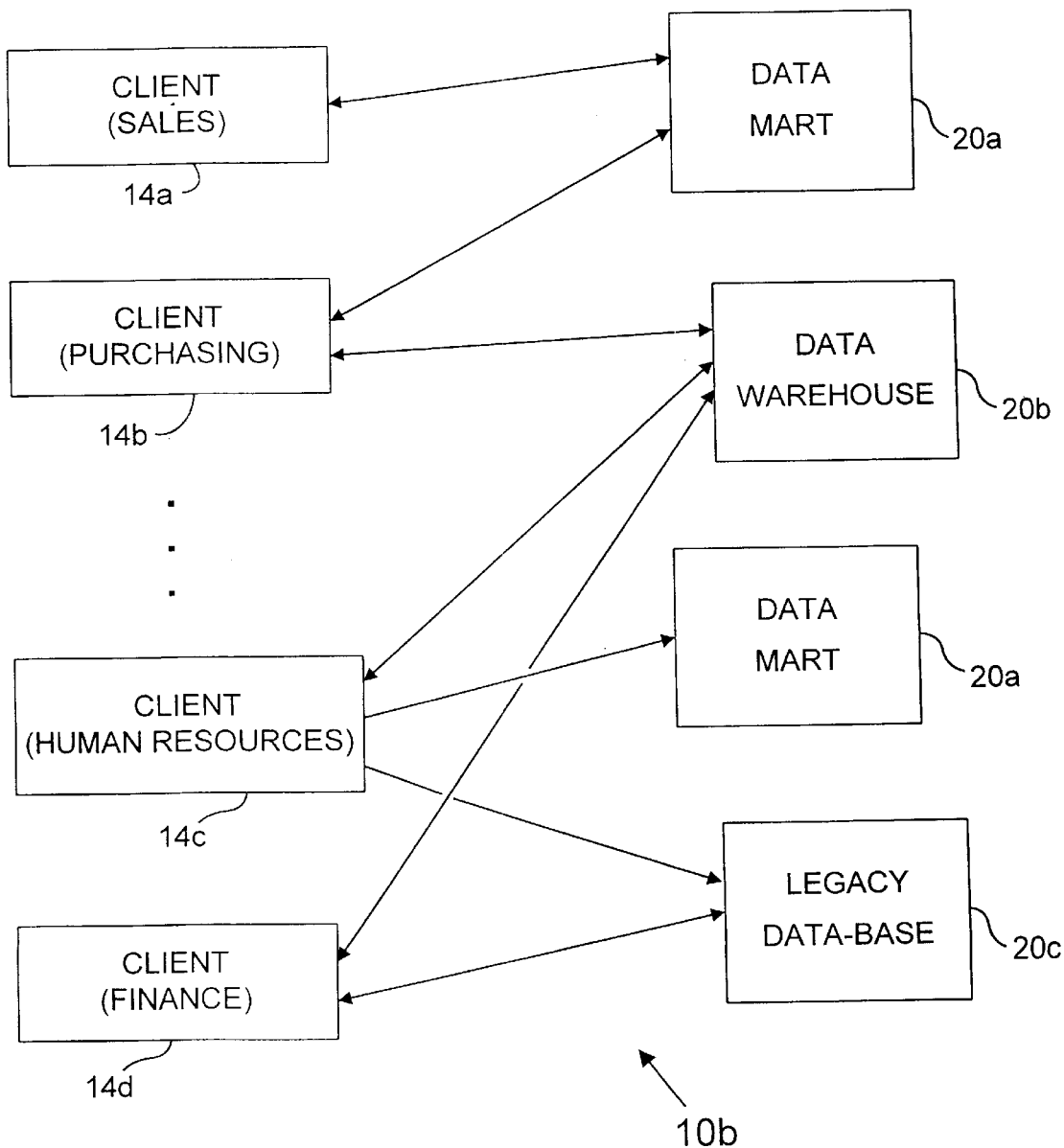
FIG. 1B provides a block diagram of a complicated and difficult to manage prior art distributed decision support system (DSS).
Figure 2:
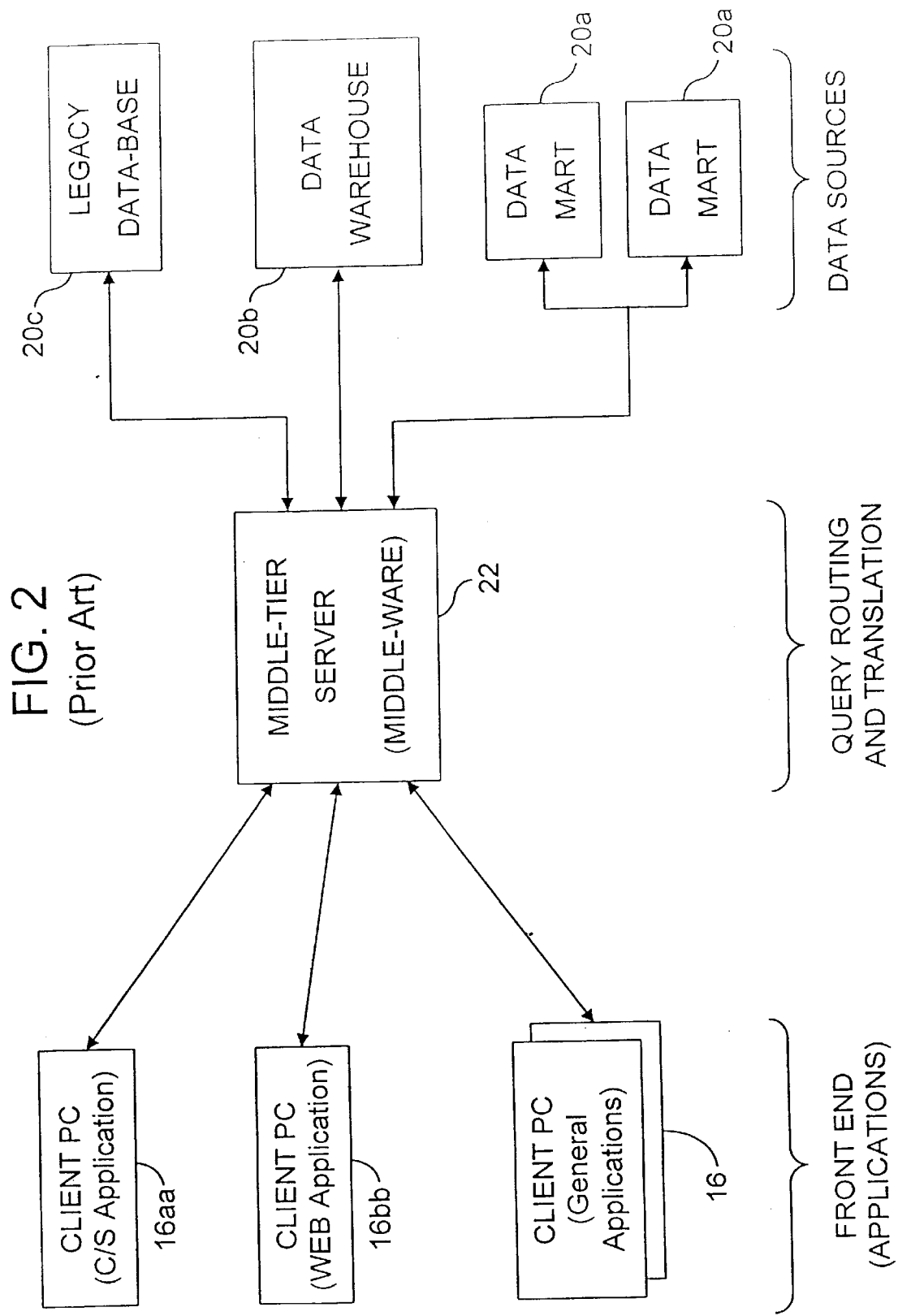
FIG. 2 depicts a prior art DSS system employing a middle-tier server coupling client computers to available data providing sources (e.g., data marts, data warehouses, and legacy database systems).

It is important to establish the definition of a number of terms and expressions that are used throughout this disclosure. The term 'query' as generated or produced by an application (program) may be assumed to be any request for any volume of data needed for commencement, continuation, and or completion of a data accessing and or data processing activity. As such, a query may require a single piece of data (e.g., a byte, word, or single array entry) or an entire array of data to be accessed and delivered to or from an application. It should be understood that the query may be made in a common query language employing, for example, an SQL instruction or an OLE request, or a custom query format/language. The term 'client computer' may be any system ranging from the ubiquitous personal computer (PC), which may also be termed a workstation, network computer, thin client, etc., to a more advanced computing device, such as a mini-computer or a super computer. As such, the term client computer is to be broadly defined. The expressions 'data accessing application executing on a client computer', or the like, is to be indicative of one or more software programs that are executing, or possibly in a suspended state—but ready to execute, that are capable of accessing and processing data. Such 'applications' may, therefore, vary from a simple spreadsheet type of program, or a data processing software program, or even a mathematical program performing complicated mathematical data reduction algorithms. An important characteristic of any such 'application' is the need to access data from, or provide data to, a distributed data warehouse system that may be composed of data marts (also referred to as departmental or summary data warehouses), legacy databases, very large databases (VLDBs), and or data warehouses. Finally, the term 'query server', which may also be referred to as a query hub or simply a hub, is intended to include any computing system that may be accessed by a plurality of client computers to determine from where queried or requested data may be directly accessed. As such, a query server is not intended to operate in a fashion wherein the actual data required to satisfy a query or query request flows through the query server, as is the case with a 'middle-tier server'. As skilled persons would appreciate, middle-tier servers are almost always interposed between a client computer and the data warehouse (or the like), as illustrated in FIG. 2. An integral function and or component of a query server, is to provide for 'query routing', as will be fully addressed below. As such the terms query server and query router may, in most cases, be employed interchangeably. It should further be noted that the original query generated by a client computer may be termed a 'logical query', while the term 'physical query' may be employed to indicate the query that is actually delivered to a particular physical server. Additional terms and their associated meanings will be provided as needed.

Figure 3:
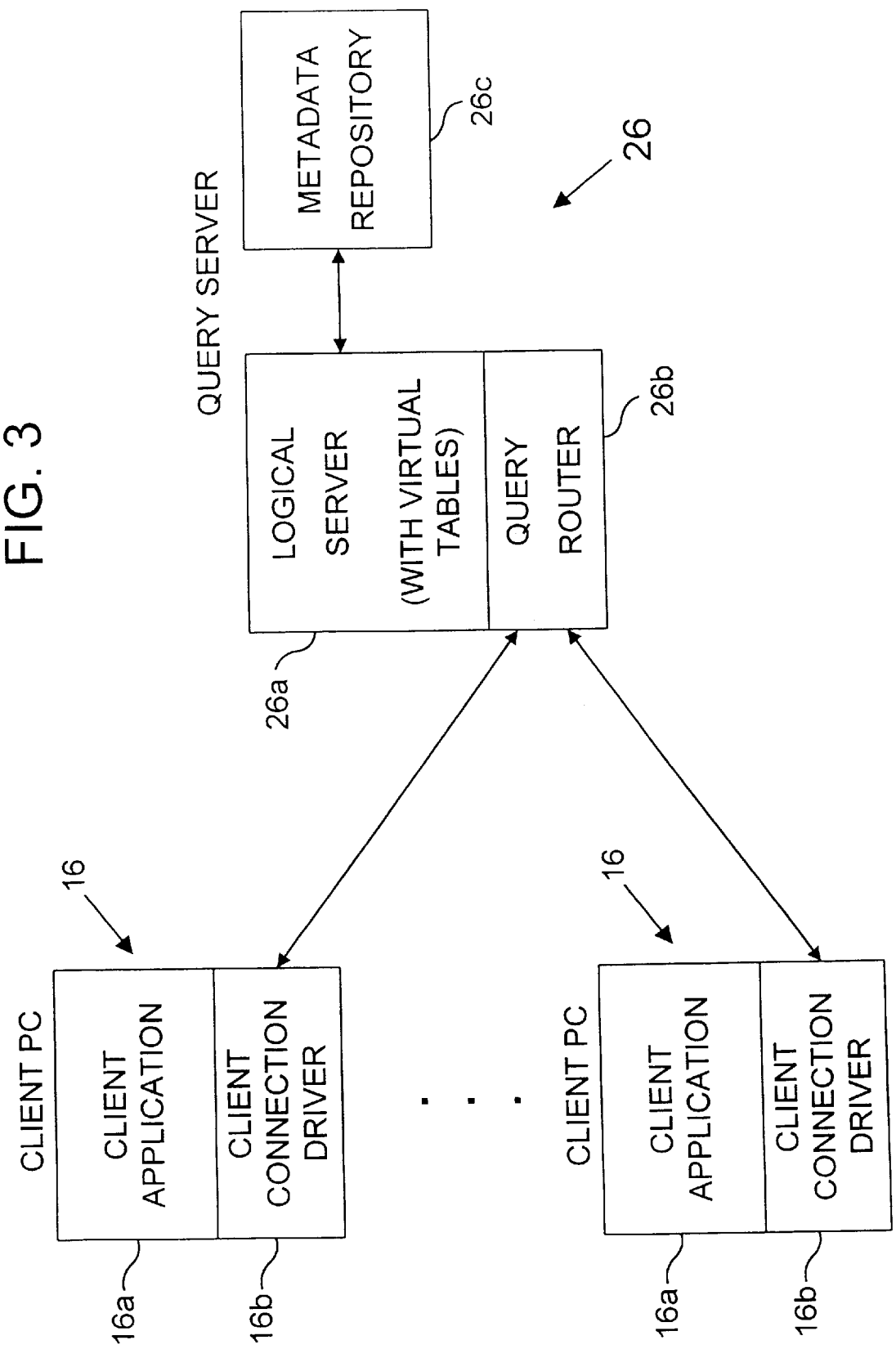
FIG. 3 illustrates a simplified high-level block diagram of a logical representation of an embodiment of the present invention.

Referring now to FIG. 3, there is provided a high-level block diagram of a logical representation of a portion of an embodiment of a distributed data warehouse system in accordance with the present invention. It should be noted that a plurality of physical servers housing data to be accessed are not included in FIG. 3, but will be shown and addressed when referring to FIG. 4. As can be seen in FIG. 3, a client PC 16, which may be referred to as a client computer, is executing an application 16a. The application 16a generates a (logical) query which is passed through a client connection driver 16b and forwarded to the query server 26. The 'forwarding' of the query may be via any suitable communication channel or network including, for example, Ethernet LANs, ATM networks, and or the Internet. Further, other drivers or software components may be accessed by the connection driver 16b to actually forward the query to the query server 26 via the communication channel. The query server 26, which as shown may include a query router 26b, will examine the query passed from the connection driver 16b, and employ a logical server 26a to resolve the query and determine a particular or preferred physical server to be accessed to satisfy the respective query generated by the client application 16a. Next, information indicating the physical server to access (in order to satisfy the query) is transmitted back to the connection driver 16b of the client PC 16 (i.e., the client computer). The connection driver 16b then transmits a request (query) to the physical server (not shown) to access the required data to satisfy the application generated query. In response to the request (for data) to the physical server, the required data is transmitted by the physical server and received at the client PC 16 and passed to the application 16a. As previously discussed, the present method eliminates the need for a middle-tier server (and the bottleneck thereat), and enables the required data to be passed directly from the physical server to the client computer without passing through such a server.

As can be seen in FIG. 3, the logical server 26a may be composed of one or more virtual tables organized according to a plurality of business rules of an organization, and the distributed data warehouse system thereof. A virtual table appears to a client application as a standard database table having rows and columns. Importantly, each virtual table does not actually store data information. Instead, virtual tables map to one or more data supplying sources (e.g., data marts, data warehouses, etc.), which actually supply the virtual table "information" to the client. Information that defines each virtual table, the underlying (physical) servers, and the associated mappings (between the virtual tables and the physical servers) may reside on the query server 26 within a metadata repository 26c. Therefore, the determination of the actual preferred physical server to be accessed to satisfy a query may be facilitated by the use of at least one virtual table of the query server 26, utilized in conjunction with the metadata repository 26c. It should be noted that the term 'physical server', as used in the context of this disclosure, may indicate any computer system such as a data mart (DM) 20a, a data warehouse (DW) 20b, a legacy data-base 20c, or the like, which are available to respond to queries in what may preferably be arranged in a client-server (c/s) configuration.

Figure 4:
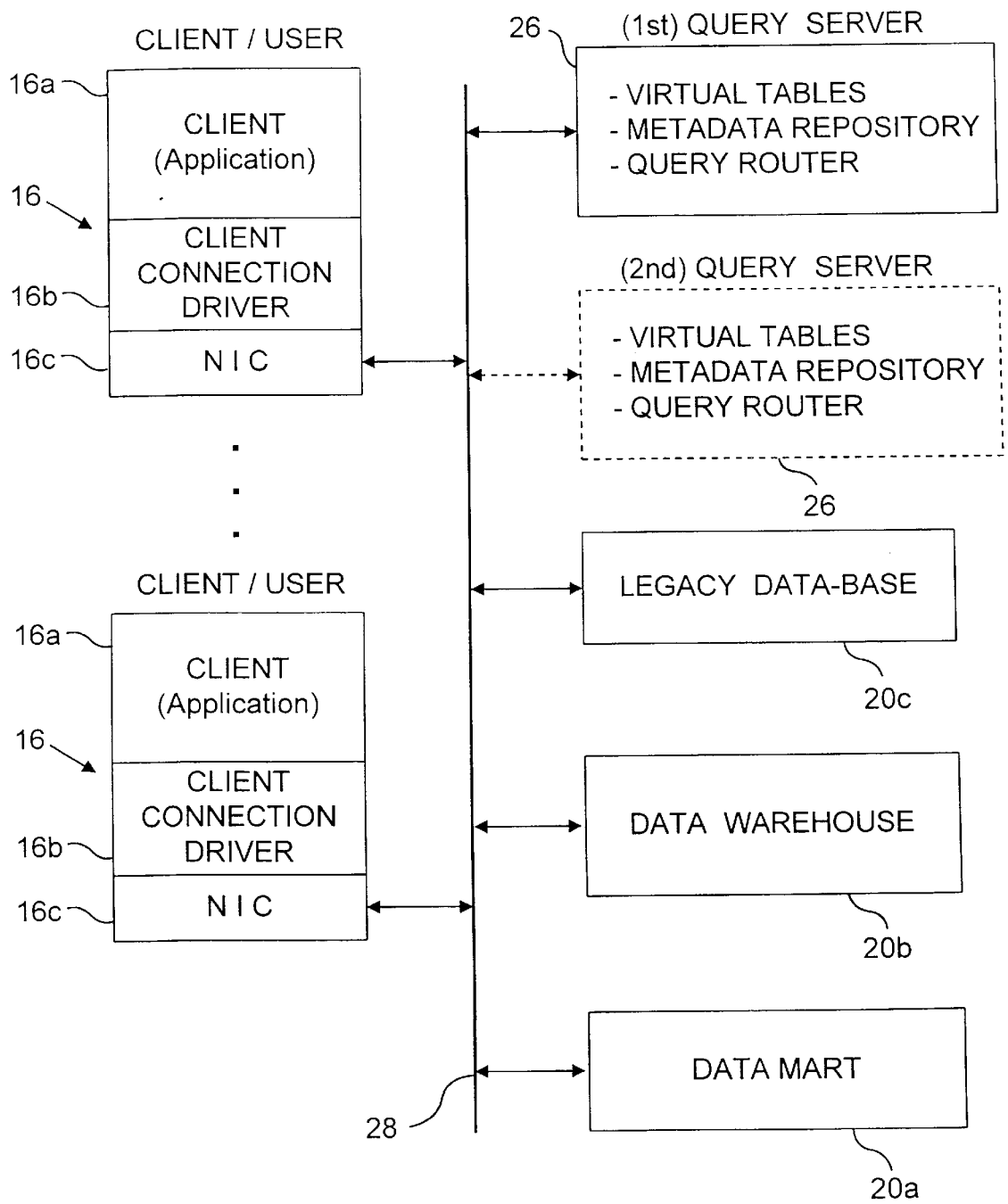
FIG. 4 shows an embodiment of a DSS system architecture consistent with the present invention.

An exemplary embodiment of an architecture according to the present invention can be seen in FIG. 4. As shown, a communication network 28 enables queries to be passed via a network interface circuit (NIC) 16c to a query server 26. Also coupled to the communication network 28 are one or more available data housing systems including data mart 20a, data warehouse 20b, and or legacy data-base 20c. The method of the present invention certainly may be modified to employ several independent communication channels (not shown) to increase throughput and enable simultaneous transfers. For example, in one possible preferred embodiment, the client PC 16 may communicate over a first communication channel to exchange information (e.g., queries) with the query server 26, while a second channel may be employed for the transfer of the actual queried or required data. Skilled persons may provide other alterations and modifications to the structure of FIG. 4 that will remain within the scope of the present invention.

As can be seen in FIG. 4, a plurality of query servers may be provided to support redundancy, when down-time must be absolutely minimized. In a preferred embodiment of such a redundant arrangement of replicated query servers 26, if a designated primary (or 1st) query server 26 does not respond to a query within a predetermined period of time, a designated secondary (or 2nd) query server 26 (shown in dotted lines) may be configured to respond to the query. In addition, should such a primary query server 26 be determined to be non-responsive, or be determined to be responding after an unacceptably long period of time, an alternate primary query server may be automatically designated to replace the original primary query server. This type of redundancy is easily supported by the architecture and methods of the present invention. Another feature that may be provided by such a configuration would be to issue an alert, which is forwarded to a monitoring station when a primary query server does not respond within the predetermined period of time. This alert may be provided by the querying client PC 16, or the query server 26 that assumes the role of the (new) primary query server.

Figure 5:
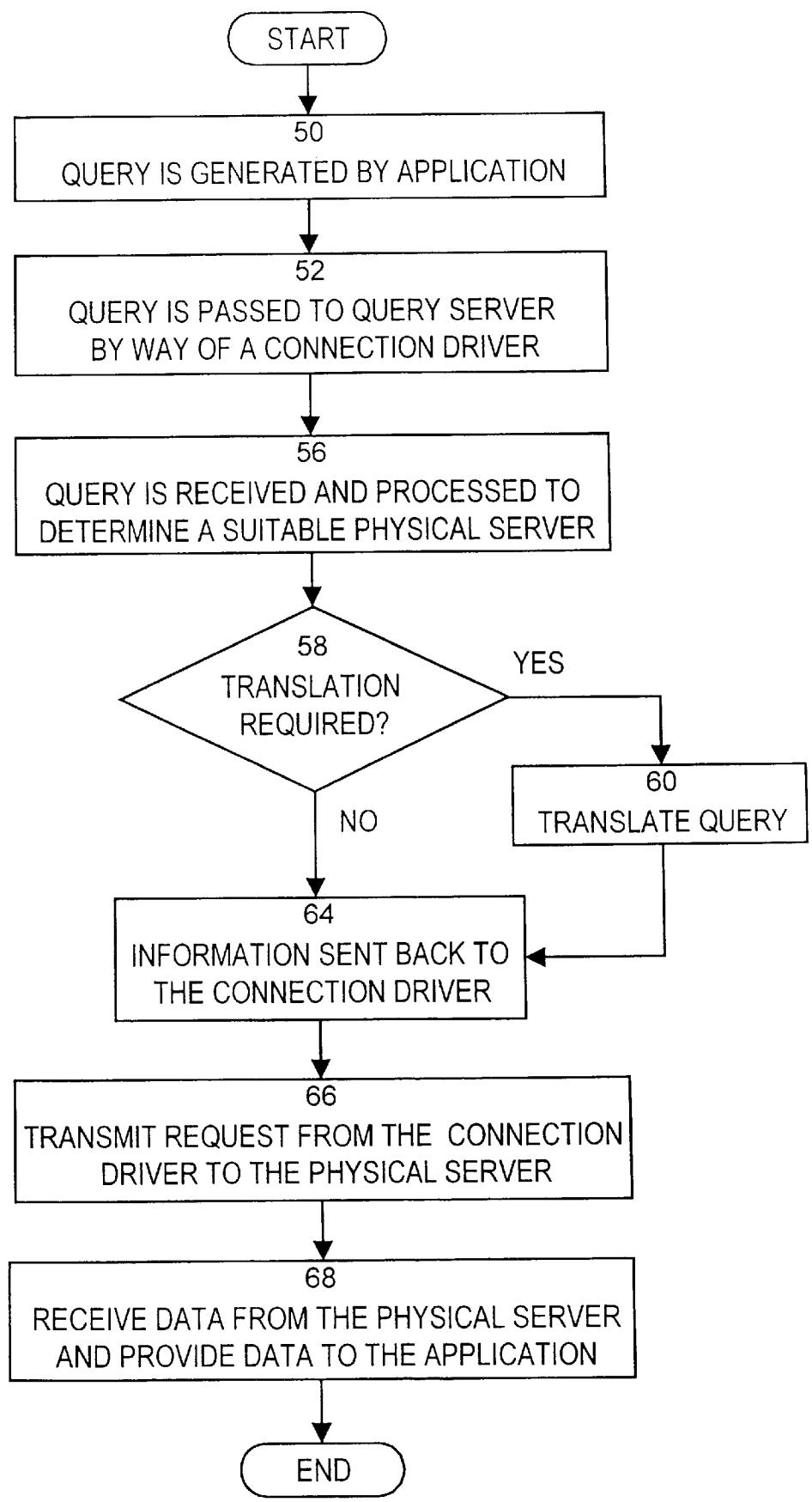
FIG. 5 presents a flow-chart of an embodiment of the present invention that inherently supports query translation and rephrasing.

Turning to FIG. 5, there is provided therein a flow chart of yet another embodiment of the method of the present invention. At 50, a query is generated by a client PC application and passed at 52 through a client connection driver and forwarded to a query server. As discussed, the passing of the query may be realized by employing any suitable communication network. At 56, the query is received and processed by an available query server. At 58 a determination is made as to whether a translation of the received query is necessary. The necessity for translation may be determined before or after a physical server has been selected to satisfy the query. If query translation (or reformatting) is required, it is provided at 60. At 64, information that may include a translated or re-phrased query, as well as the respective physical server to access, is sent back to the connection driver of the respective client computer. The connection driver at 66 then transmits the query request to the physical server to access the required data to satisfy the application generated query. At 68, data is sent from the physical server, received at the client computer, and passed (preferably via the connection driver) to the application.

It is important to understand that the description of the embodiments of the present invention are illustrative only, and other equivalent arrangements are certainly possible. Therefore, while there have been described herein the currently preferred embodiments of a distributed data warehouse query and management system, those skilled in the art will recognize that other and further modifications may be made without departing from the present invention, and it is intended to claim all modifications and variations as fall within the scope of the appended claims.

What is claimed is:

1. A method for servicing data queries to a distributed data warehouse system generated by at least one data accessing application executing on at least one client computer, the distributed data warehouse system being composed of a plurality of physical servers housing data to be accessed, the method comprising:

a) generating a query for data required by the application executing on the client computer;

b) passing the query to a connection driver of the client computer;

c) forwarding the query to a query server;

d) receiving the query at the query server;

e) determining at the query server a specific physical server within the distributed data warehouse system to be accessed in order to resolve the query for the required data;

f) transmitting back to the connection driver of the client computer information indicating the physical server to access in order to satisfy the query;

g) transmitting a request from the connection driver to the physical server to satisfy the query; and h) receiving the required data at the client computer and providing said data to the application;

i) wherein the required data is passed directly from the physical server to the client computer without passing through the query server.

2. The method according to claim 1, wherein the query server rephrases the query, if necessary, to establish a query format that is compatible with the respective physical server to which the query is to be sent to access the required data, thereby providing a means to translate queries, which would otherwise be incompatible with the physical server having the required data, in a manner that is transparent to the application executing on the client.

3. The method according to claim 2, wherein the query server includes at least one virtual table organized according to a plurality of business rules associated with the distributed data warehouse system and the available physical servers thereof, such that each virtual table holds mapping information to enable the query server to select a preferred physical server to be accessed to satisfy the query.

4. The method according to claim 2, wherein the query server includes a query router that considers loading status of a plurality of the physical servers to steer queries in order to effect load balancing of queries sent to available physical servers of the distributed data warehouse system.

5. The method according to claim 4, wherein the application executing on at least one of the clients is an internet web server.

6. The method according to claim 5, wherein at least one physical server is accessed by way of an internet network connection.

7. The method according to claim 4, further providing a plurality of replicated query servers, such that if a designated primary query server does not respond to a query within a predetermined period of time, a designated secondary query server will respond to the query.

8. The method according to claim 7, wherein an alert is forwarded to a monitoring station when a primary query server does not respond within the predetermined period of time.

9. The method according to claim 8, wherein an alternate primary query server is automatically designated should an original primary query server be determined to be non-responsive.

10. A method for servicing data queries generated by at least one data accessing application executing on at least one client computer, the client computer having access to a distributed data warehouse system that is composed of a plurality of physical servers housing data to be accessed, the method comprising:

a) generating a query for required data by the application executing on the client computer;

b) passing the query to a connection driver of the client computer having access to a communication network;

c) forwarding the query via the communication network to a query router;

d) receiving the query via the communication network at the query router and determining thereat a specific physical server within the distributed data warehouse system to be accessed to resolve the query and provide the required data;

e) rephrasing the query, if necessary, to establish a query format that is compatible with the physical server to which the query is to be sent to access the required data;

f) transmitting back over the communication network information to the connection driver of the client computer indicating the physical server to be accessed to satisfy the query; the information including, if necessary, a rephrased query format to be sent to the physical server;

g) transmitting to the physical server, also connected via a communication network, a request for the required data to satisfy the query;

h) receiving the data at the client computer and providing the queried data to the application;

i) wherein the required data is passed over the communication network directly from the physical server to the client computer without the need for a middle-tier server.

11. The method according to claim 10, wherein the query server includes virtual tables that are organized according to a plurality of business rules associated with the distributed data warehouse system; wherein each virtual table holds mapping information to enable the query server to select a preferred physical server to be accessed to satisfy the query.

12. The method according to claim 11, wherein the query router is a program executing on a query server, which considers the loading status of a plurality of physical servers to direct queries in order to effect load balancing of queries sent to the available physical servers.

13. The method according to claim 10, such that when a query from a client computer requires access to a physical server for which the client computer connection driver is not compatible, the query server automatically transmits a replacement, updated connection driver to the client computer, as well as indicating the physical server to be accessed to satisfy the query.

14. The method according to claim 10, such that a query from an originating client computer is directed by the query router to a particular physical server based on compatibility of the query format produced by the originating client computer in order to eliminate the need to translate the format of the query.

\* \* \* \* \*